No. 642,907. Patented Feb. 6, 1900.
O. B. HOEY.
WATER FILTER.
(Application filed June 3, 1899.)
(No Model.) 2 Sheets—Sheet 2.
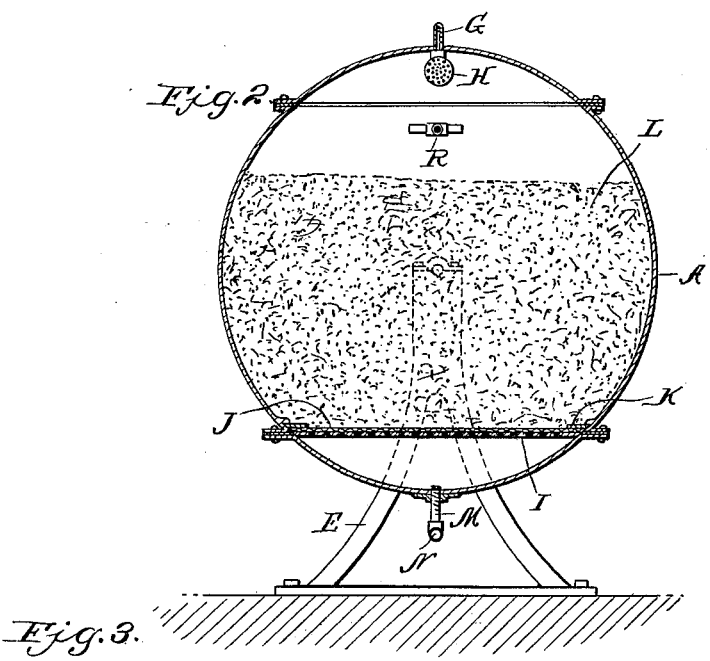
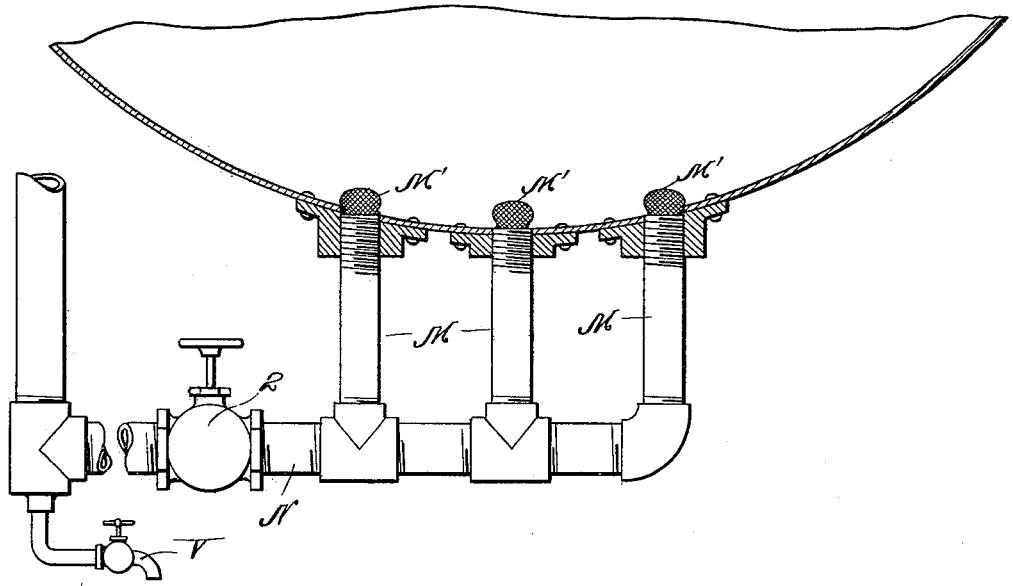
Witnesses
E. C. Wurdeman
J. J. Williamson
Inventor
Otis B. Hoey
G. Neale Hayselton
Atty

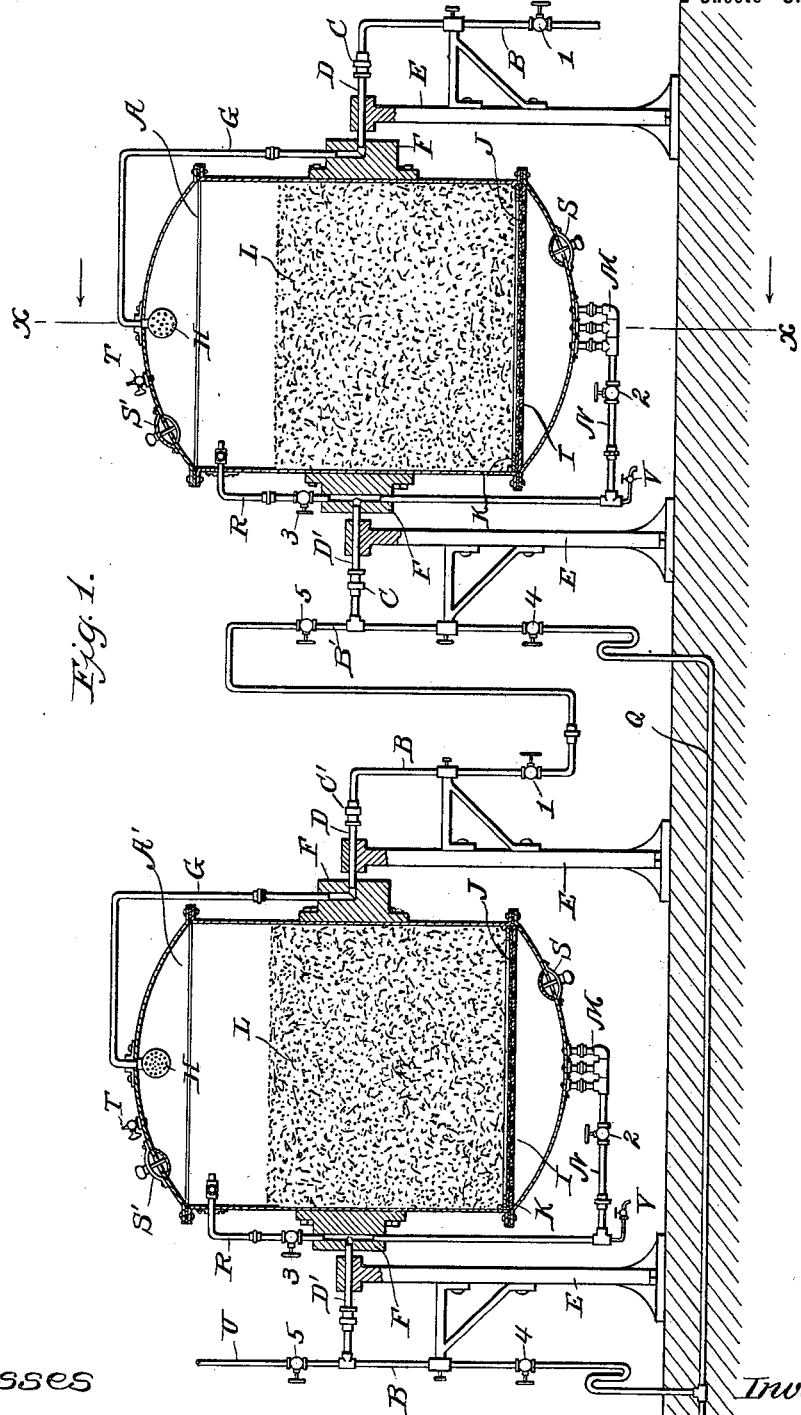

UNITED STATES PATENT OFFICE.

OTIS B. HOEY, OF PHILADELPHIA, PENNSYLVANIA, ASSIGNOR OF ONE-HALF TO GEORGE J. ROESCH, OF SAME PLACE.

WATER-FILTER.

SPECIFICATION forming part of Letters Patent No. 642,907, dated February 6, 1900.

Application filed June 3, 1899. Serial No. 719,324. (No model.)

*To all whom it may concern:*

Be it known that I, OTIS B. HOEY, a citizen of the United States, residing at Philadelphia, in the county of Philadelphia and State of Pennsylvania, have invented a certain new and useful Improvement in Water-Filters, of which the following is a specification.

My invention relates to a new and useful improvement in water-filters, and has for its object to provide an exceedingly simple and effective means whereby water may be filtered by pressure through a suitable filtering agent.

A further object of my invention is to provide for the thorough cleansing of the filtering agent without the removal thereof from the filter and without deteriorating the filtering agent; and a still further object of my invention is to so construct the filter as to permit it to be arranged in battery form—that is, two or more filters so connected together as not to interfere with the action of each other—thereby carrying the filtering process to a further degree than if a single apparatus were used.

With these ends in view this invention consists in the details of construction and combination of elements hereinafter set forth and and then specifically designated by the claims.

In order that those skilled in the art to which this invention appertains may understand how to make and use the same, the construction and operation will now be described in detail, referring to the accompanying drawings, forming a part of this specification, in which—

Figure 1 is a section of a battery of two filters made in accordance with my improvement and coupled together for use; Fig. 2, a section at the line $x\,x$ of Fig. 1; and Fig. 3 an enlarged section of a portion of one of the filters, showing the multiple exit-pipes.

In carrying out my invention as here embodied I provide one or more cylinders A and A', each being the counterpart of the other, and therefore the following description applying to one of these cylinders and its connections applies also to the other and its connections. A supply-pipe B leads from the water source, such as an ordinary water-main, to the coupling C, which connects this pipe to the trunnion-pipe D, the latter being mounted in the upright E, so as to revolve, the coupling being properly constructed and packed to permit this revolving without leakage. The cylinder has the blocks F secured to the ends thereof, and the trunnion-pipes D and D' are secured within these blocks, thus properly mounting the cylinder so that it may be revolved, while permitting the water to pass to and from the same, for the purpose hereinafter set forth.

The pipe G leads from the right-hand block and enters the cylinder at the top thereof, terminating in a screen or perforated nozzle H, which serves to properly distribute the water in entering this cylinder.

The cylinder is constructed of two heads or ends, to which the body portion thereof is riveted or otherwise attached, and this body portion is preferably of convex form, as clearly shown, having secured therein the partition I, which consists of a perforated plate fitted within the cylinder and upon which is superimposed a wire or other suitable screen J, held down by the flanges K. Upon this screen is supported the filtering agent L, which may be of sand or other suitable material, preferably the former, so that water entering at the top of the cylinder will percolate through this filtering-bed, reaching the lower compartment free of the impurities which will gradually accumulate upon and in the filtering-bed.

M represents the multiple exit from the cylinder leading to the pipe N, the latter having the valve 2 therein, and this pipe passes to the left-hand block F, so as to convey the filtered water to the trunnion-pipe D'. If a single cylinder is used, a suitable faucet may be connected with the trunnion-pipe D' for drawing off the filtered water; but if a second filtering-cylinder is utilized a pipe B' is connected by a packed coupling to the trunnion-pipe, one branch of which has a valve 5 therein and leads to the packed coupling C' and from thence to the cylinder A' in the same manner as just described in connection with the cylinder A.

The lower branch of the pipe B' has therein a valve 4 and leads to the drain-pipe Q. A run-around pipe R leads from the upper portion of this cylinder to the block F and is provided with a valve 3, which is kept closed during the normal operations of the filter, but is opened when the filtering-bed is to be cleansed, as will be hereinafter set forth.

S and S' are handholds, with suitable covers thereon, by means of which access may be had to the interior of the cylinder when occasion requires and for the insertion or removal of the filtering material.

A suitable air-vent T is provided in the top of each cylinder to permit the withdrawal of the water when the pressure has been shut off.

When the filter is in normal operation, the valve 1, controlling the supply-pipe, is opened, and the water passing through the pipes B, D, and G reaches the upper portion of the cylinder, and when the space above the filtering-bed has been filled the weight of the water and the pressure of the supply causes it to percolate through the filtering-bed and reach the space below the partition I. From thence the water passes through the pipes N, D', and B' to the second cylinder A', where it is further filtered in the same manner as just described and, passing from this cylinder, reaches the delivery-pipe U, the lower portion of which connects with the drain-pipe Q, suitable valves being located therein for the same purpose as just described in connection with the cylinder A.

When the flow of water just described is taking place, the valves 1, 2, and 5 are opened and the corresponding valves connected with the cylinder A', while the remaining valves are closed; but when it is desired to cleanse the filtering-bed the valve 1 is first closed, thus shutting off the water-supply, when the valves 2 and 5 are next closed, after which the valves 3 and 4 are opened and the water permitted to flow from the upper portion of the cylinder to the drain-pipe. Then the supply-valve 1 is opened, thus flushing the cylinder and the filtering-bed, during which time the cylinder may be revolved upon the trunnion-pipes D and D', thus scouring the material of which the filtering-bed is composed and at the same time permitting the accumulations which are thus removed from the filtering material to flow through the pipes R and D' to the drain.

It has been found in practice that the cleansing of the filtering-bed by this process will thoroughly remove all foreign matter from the filtering material and scour the same, and when this filtering material is of sea-sand or the like every particle thereof will become white and clean as though it had never been used for filtering purposes. When the scouring process has been finished, the cylinder is again adjusted to the position shown, which will restore the filtering-bed to its normal condition.

The inner ends of the multiple exit-pipes M may be protected by the screens M', so as to prevent them from becoming clogged with particles from the filtering-bed which may pass through the screen J.

V represents faucets which may be used for draining the various pipes of the system when desired.

Of course it will be understood that any number of filtering-cylinders may be arranged in battery form, as here shown, as they do not interfere with each other, and to the extent that these cylinders are increased the purity of the water will be increased when delivered to the pipe U.

I do not wish to be limited to the exact details of construction here shown, nor as to the shape or sizes of the various parts, as these may be varied to considerable extent without departing from the spirit of my invention.

Having thus fully described my invention, what I claim as new and useful is—

1. In a filter, a cylinder, blocks thereon having passages, trunnion-pipes on which the blocks are mounted, run-around pipes leading from the upper portions of the cylinders to the passages of the blocks, and a pipe connecting a passage of the block with the lower end of the cylinder.

2. In combination, a cylinder, blocks thereon having passages, trunnion-pipes fitting in the horizontal portions of the passages, a pipe leading from the block to the top of the cylinder, a perforated plate, a screen on the plate, a filtering agent, a multiple exit at the bottom of the cylinder, a pipe leading therefrom to the block, a run-around pipe from the block to the top of the cylinder and supply and drain pipes suitably valved, as and for the purpose described.

In testimony whereof I have hereunto affixed my signature in the presence of two subscribing witnesses.

OTIS B. HOEY.

Witnesses:
M. E. HAMER,
S. S. WILLIAMSON.